July 27, 1965  J. TATKO  3,196,584
ABRASIVE WHEELS AND SEGMENTED DIAMOND WHEELS
Filed June 28, 1963  4 Sheets-Sheet 1
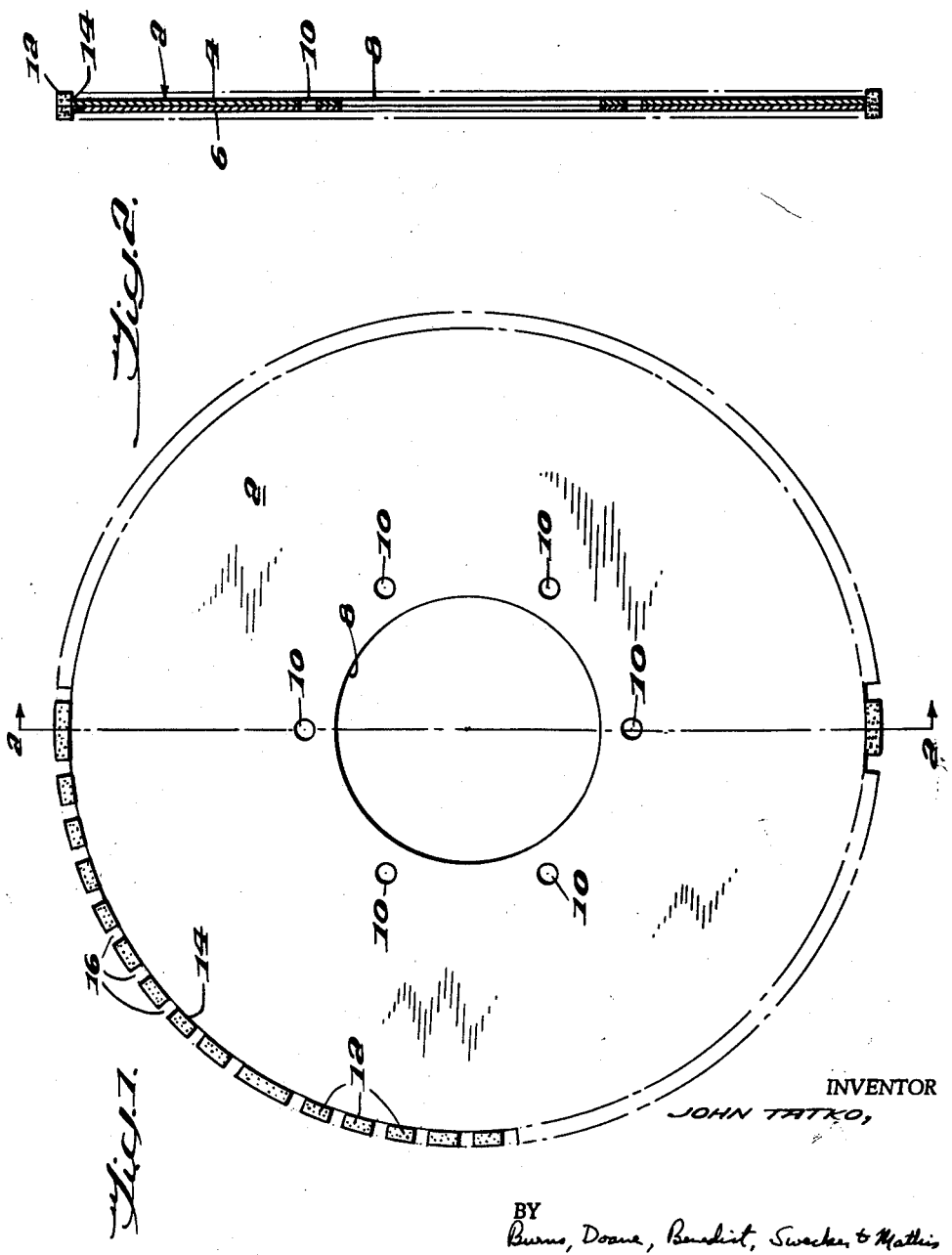
INVENTOR
JOHN TATKO,
BY
Burns, Doane, Benedict, Swecker & Mathis
ATTORNEYS July 27, 1965 J. TATKO 3,196,584
ABRASIVE WHEELS AND SEGMENTED DIAMOND WHEELS
Filed June 28, 1963 4 Sheets-Sheet 2
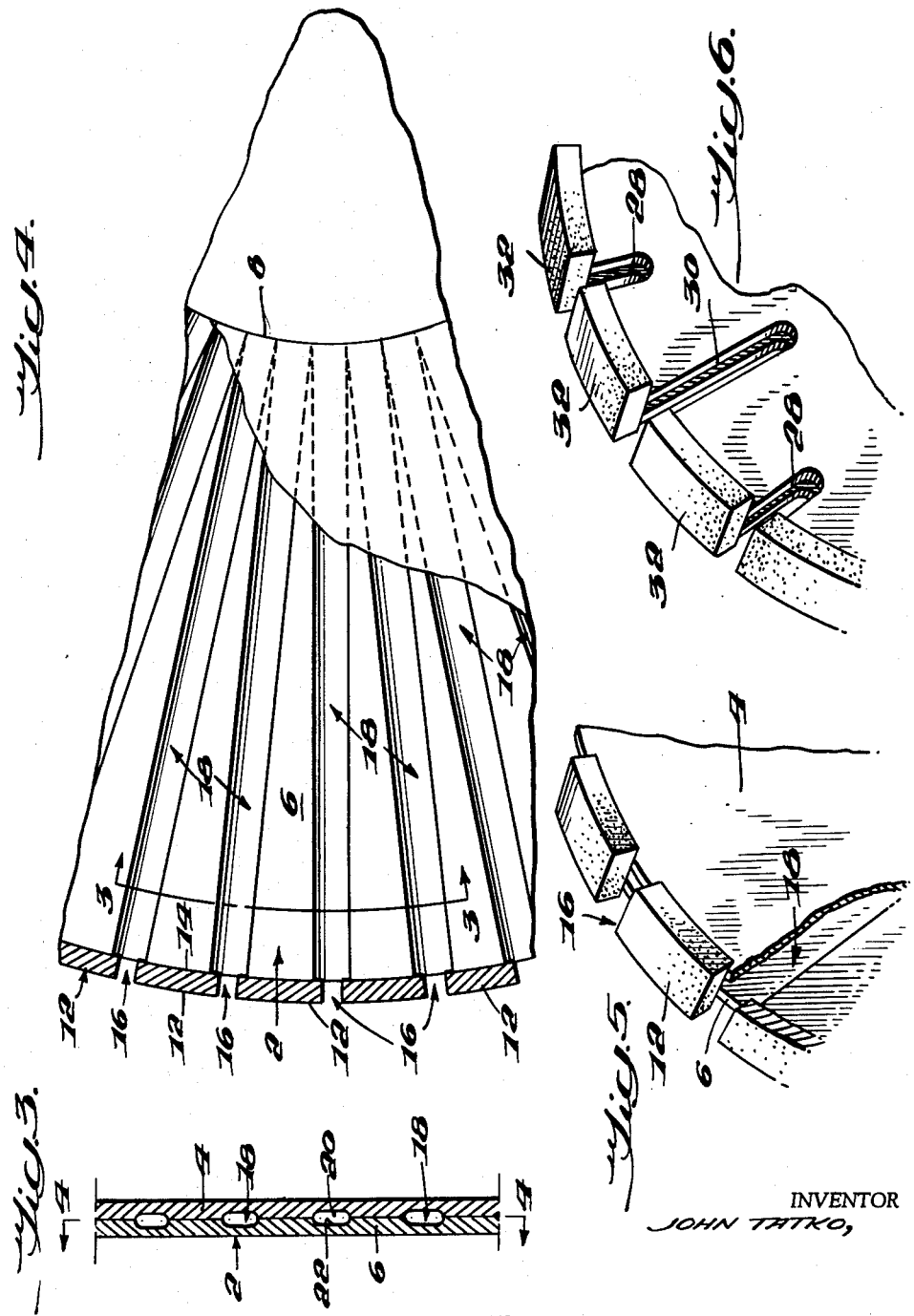
INVENTOR
JOHN TATKO,
BY
Burns, Doane, Benedict, Swecker & Mathis
ATTORNEYS

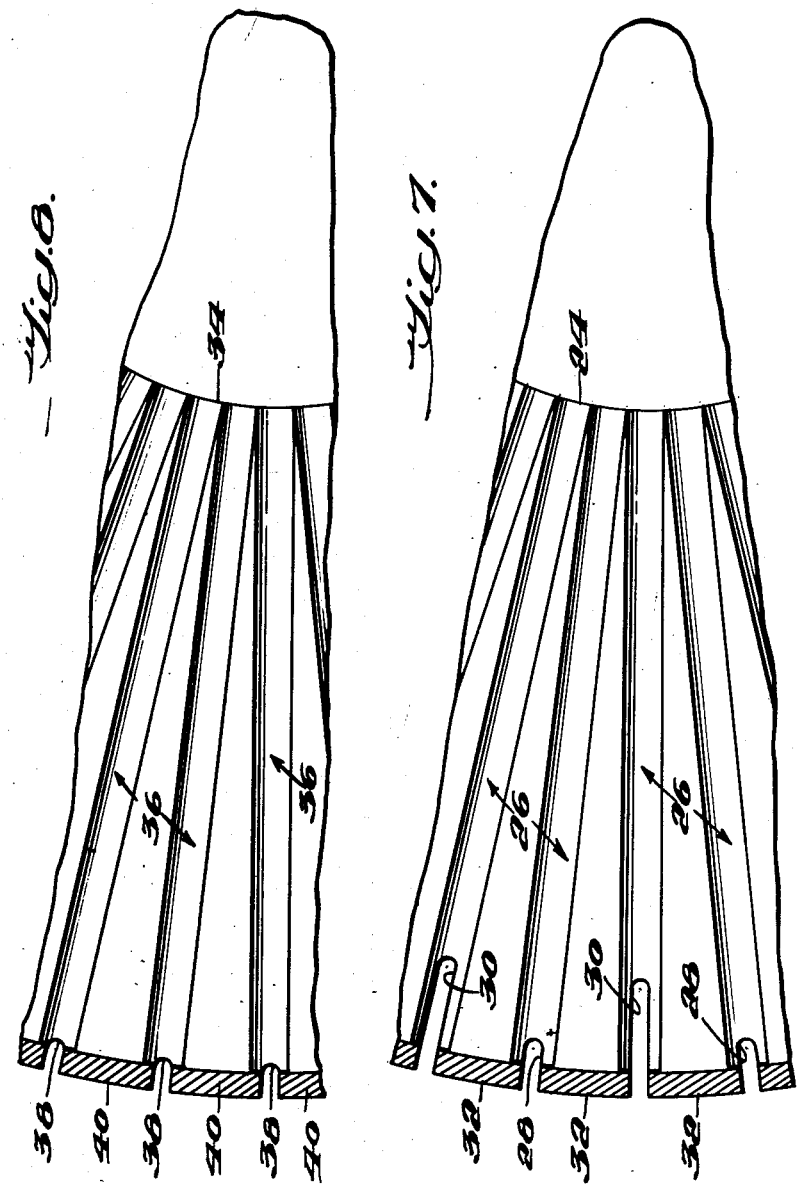

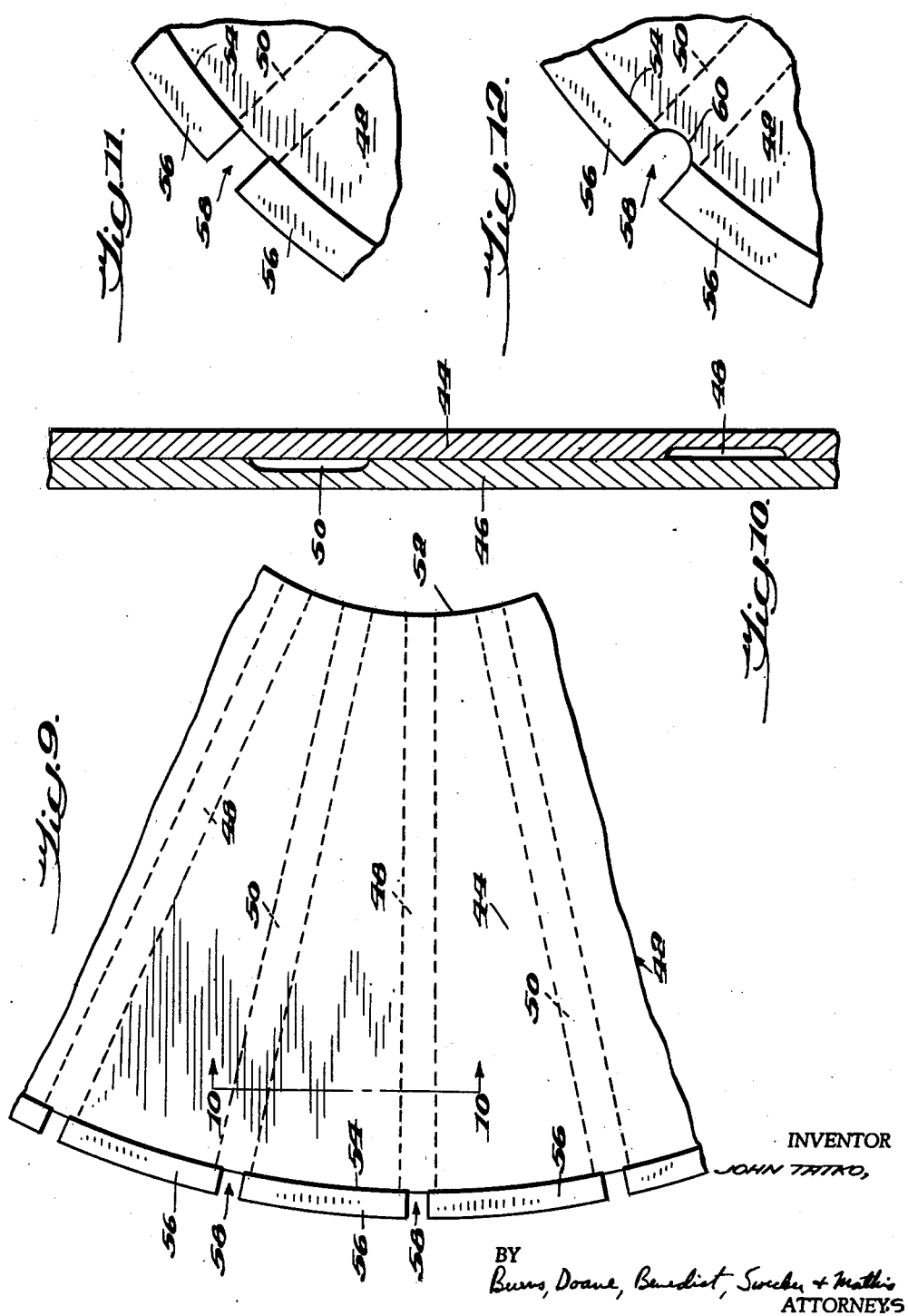

United States Patent Office 3,196,584
Patented July 27, 1965

3,196,584
ABRASIVE WHEELS AND SEGMENTED DIAMOND WHEELS
John Tatko, Middle Granville, N.Y.
Filed June 28, 1963, Ser. No. 291,397
12 Claims. (Cl. 51—206)

This invention relates to abrasive wheels and segmented diamond wheels and, more particularly, to abrasive circular grinding blades.

Ordinary metal circular saw blades are not sufficiently hard for cutting stone, particularly marble and granite, hardened metals and other hard materials. It is necessary to use an abrasive material molded in the form of a circular wheel to grind away and cut through these hard materials. Abrasive grinding wheels are conventionally molded in a single piece of a composition containing granules or particles of silicon carbide, aluminum oxide, iron oxide, or diamonds. These particles are extremely hard and will cut through even the hardest materials. A conventional grinding wheel is mounted on a spindle which rotates at a very high speed and by moving the workpiece radially relative to the grinding wheel, the peripheral edge of the wheel grinds a kerf in the workpiece.

Due to the abrasive action of the grinding wheel against the workpiece, heat is generated at a rapid rate in the zone of coaction between the workpiece and the grinding wheel. While the rotating wheel is in contact with the workpiece, the abrasive bonding composition is worn away sufficiently to expose the abrasive particles. The rate at which the grinding wheel is worn away increases as the rate at which heat is generated in the zone of coaction between the workpiece and the grinding wheel increases. Under extreme conditions, excessive heat may cause welding of the abrasive particles to the workpiece.

Attempts have been made to cool abrasive grinding wheels or blades and to remove the dust and particles which are worn away from the workpiece and from the grinding wheel. One method of cooling and removing the dust is by directing a stream of water from a hose or conduit into the zone of coaction between the wheel and the workpiece. Due to the rapid rotation of the wheel, however, very little of the water actually reaches that portion of the workpiece in which the highest heat is generated and most of the cooling of the wheel occurs after the wheel has passed through the zone of coaction. Furthermore, very little of the water removes the chips from the workpiece, since it does not flow into the kerf, but is swept around the cutting zone by the rapidly flowing air stream accompanying the rotation of the grinding wheel.

Another method of directing water into the saw kerf for cooling and dust removal is to enclose the wheel in a housing and to direct a stream of water into the housing, so that the water flows radially along the outside surface of the wheel. This improves the cooling of the wheel to some extent, but the water is deflected by the workpiece and does not enter the zone of coaction between the grinding wheel and the workpiece to cool the blade in that zone and to facilitate removal of the dust.

Accordingly, it is an object of this invention to provide an improved abrasive grinding blade.

It is another object of this invention to provide an abrasive grinding blade having means for directing coolant into the zone of coaction between the blade and a workpiece.

It is a further object of this invention to provide a water cooled abrasive grinding blade which effectively accomplishes dust removal from the kerf.

These objects are accomplished in accordance with the preferred embodiment of the invention by a circular metallic disk having a plurality of channels or passageways extending from the center of the disk toward the peripheral surface. A plurality of abrasive segments are secured to the peripheral surface of the disk and extend between the channels or passageways. The center of the blade has a circular opening therethrough for conducting water to the inner radial end of the channels. As the wheel rotates, the water flows through the channels to the peripheral surface of the blade and outward between the abrasive segments into the zone of coaction between the abrasive segments and the workpiece.

This preferred embodiment of the invention is illustrated in the accompanying drawings in which:

FIG. 1 is an elevational view of an abrasive blade of this invention;

FIG. 2 is a cross-sectional view of the blade along the line 2—2 in FIG. 1;

FIG. 3 is a cross-sectional view of the blade along the line 3—3 in FIG. 4;

FIG. 4 is an enlarged cross-sectional view of the blade along the line 4—4 in FIG. 3;

FIG. 5 is an enlarged fragmentary perspective view of the peripheral edge of the blade shown in FIG. 1;

FIG. 6 is an enlarged fragmentary perspective view as in FIG. 5 of a modified form of the abrasive blade as shown in FIG. 7;

FIG. 7 is an enlarged cross-sectional view as in FIG. 4 of a modified form of the abrasive blade of this invention;

FIG. 8 is an enlarged cross-sectional view as in FIG. 4 of another modified form of the blade of this invention;

FIG. 9 is an enlarged elevational view of a third modified form of the blade of this invention;

FIG. 10 is a cross-sectional view of the blade along the line 10—10 in FIG. 9;

FIG. 11 is a fragmentary view of the peripheral edge of the blade shown in FIG. 9; and FIG. 12 is a fragmentary view as in FIG. 9 showing a modified groove.

Referring to FIGS. 1 and 2, an abrasive blade in accordance with a preferred embodiment of the invention includes a disk 2 formed of a pair of flat, circular plates 4 and 6 having their opposing radial faces welded or otherwise suitably secured together. The central portion of the disk 2 has been removed to form a circular opening 8 therethrough. A plurality of bolt holes 10 extend through the disk 2 and are arranged in equally spaced relation around the circular opening 6. A plurality of abrasive segments 12 are secured by welding or other suitable means along the peripheral edge 14 of the disk 2. As shown in FIG. 2, the segments are wider than the combined thicknesses of the plates 4 and 6, so that the radial faces of the disk 2 will not bind against the workpiece in the kerf. The segments 12 are spaced apart from each other, so that a plurality of spaces 16 are formed between the segments 12.

As shown in FIGS. 3 and 4 a plurality of passageways 18 are formed in the disk 2 and extend from the central opening 8 in the disk to the peripheral surface 14. The spaces 16 between the segments 12 coincide with the outer ends of the passageways 18. Communication is therefore established between the central opening 8 of the disk 2 and the outer surfaces of the segments 12, for the flow of water into the cutting zone.

The manner in which the passageways 18 are formed is shown in FIG. 3. A plurality of radial grooves 20 and 22 are formed in the opposing radial faces of each of the plates 4 and 6. The number and spacing of the grooves in each of the plates is substantially the same, so that when the grooved faces of the plates are fitted together the grooves 20 and 22 are in alignment and form passages 18, as shown in FIGS. 3, 4 and 5.

A modified form of the invention is shown in FIGS. 6 and 7. The modified disk has a central opening 24 and radial passageways 26 formed between the plates corresponding to the central opening 8 and passageways 18 of the blade shown in FIGS. 1 to 5. A plurality of shallow slots 28 and a plurality of deep slots 30 are formed in the disk. The radial slots 28 and 30 are arranged alternately and are in axial alignment with the passageways 26. The segments 32, which are substantially the same as those shown in FIGS. 1 to 5, are welded or otherwise secured to the peripheral edge of the disk.

In another modified form of the invention, as shown in FIG. 8, a disk having a central opening 34 and radial passageways 36 similar to the disk 2 shown in FIGS. 1 to 5, is provided with a plurality of transverse grooves 38, which are formed in the peripheral edge of the disk. The grooves 38 intersect the passageways 36 and a plurality of segments 40, corresponding to the segments 12 of FIGS. 1 and 5 are secured to the blade.

The slots 28 and 30, and the grooves 38, as shown in FIGS. 7 and 8, provide an outlet for the water which flows through the passageways 26 and 36, respectively, for cooling the outer peripheral edge of the blades, while at the same time permitting water to flow into the space between the segments 32 and 40, thereby cooling the segments and facilitating dust removal. In the modified form shown in FIG. 7, a greater proportion of the water in the passageways 26 flows out through the deeper slot 30, than through the shallow slot 28. The deeper slots 30, therefore, primarily cool the blade, while the shallow slots 28 direct a greater proportion of the water from the passageways 26 into the zone of coaction between the segments 32 and the workpiece. In the modified form shown in FIG. 8, only a small proportion of the water flowing through the passageways 36 flows transversely through the grooves and the greater proportion of the water flows between the segments 40.

In a third modification, as shown in FIGS. 9 and 10, a disk 42 is formed of a pair of circular plates 44 and 46, which are welded together. Radial grooves 48 and 50 in the opposing faces of the plates 44 and 46, respectively, extend from a central opening 52 in the disk 42 to the outer peripheral edge 54 of the disk. In cooperation with the opposite plate, the grooves 48 and 50 form radial passageways through the disk 42.

Abrasive segments 56, such as diamond segments, are welded or otherwise suitably secured to the peripheral edge 54 of the disk 42 and, as shown in FIGS. 9 and 11, the segments 56 are spaced apart to allow water and air to flow from the grooves 48 and 50 and through the space 58 between the segments.

The depth of the space 58 may be increased in a modified form of the disk 42, as shown in FIG. 12. A transverse groove 60 may be provided in the disk 42 to permit coolant fluid to be dispersed along the peripheral edge 54 and into the space 58 between the segments.

The blade of this invention may be mounted on a spindle between hubs which are fastened together by means of bolts through the holes 10. Suitable means are provided for conducting a stream of water to the central opening 8 in the disk and as the wheel rotates rapidly, centrifugal force causes the water to flow through the radial passageways 18 and through the spaces 16 between the segments 12. In this manner the segments 12 and the disk 2, as well as the workpiece remains relatively cool, the dust particles are effectively removed and the wear on the segments 12 is greatly minimized.

While this invention has been illustrated and described in one embodiment, it is recognized that variations and changes may be made therein without departing from the invention as set forth in the claims.

I claim:

1. An abrasive grinding blade comprising a pair of circular plates, one radial face of each plate having a plurality of radial grooves therein, the grooves in said grooved radial faces being spaced circularly at corresponding angular positions in each of said plates, said plates having their grooved radial faces secured together with said grooves in alignment to form radial passageways, abrasive grinding material secured to the peripheral edges of the plates, means communicating between the passageways and the outer circumference of said material, whereby coolant fluid is conveyed to the zone of coaction between the abrasive material and a workpiece.

2. An abrasive grinding blade comprising a pair of circular plates, one radial face of each plate having a plurality of radial grooves therein, the grooves in said grooved radial faces being spaced circularly at corresponding angular positions in each of said plates, said plates having their grooved radial faces secured together with said grooves in alignment to form radial passageways, a plurality of abrasive segments secured to the peripheral edge of the disk, said segments being spaced apart and forming openings therebetween, said passageways terminating in said openings, whereby coolant fluid is conveyed to the zone of coaction between the abrasive material and a workpiece.

3. An abrasive grinding blade comprising a circular disk, a plurality of abrasive segments secured to the peripheral edge of the disk, said segments being spaced apart, and a plurality of passageways extending from the center of the disk radially through the disk and terminating in the spaces between the segments, said disk having a plurality of transverse slots intersecting said passageways adjacent said peripheral edge, whereby coolant fluid is conveyed to the zone of coaction between the abrasive material and a workpiece.

4. An abrasive grinding blade comprising a pair of circular plates, one radial face of each plate having a plurality of radial grooves therein, the grooves in said grooved radial faces being spaced circularly at corresponding angular positions in each of said plates, said plates having their grooved radial faces secured together with said grooves in alignment to form radial passageways, a plurality of abrasive segments secured to the peripheral edge of the disk, said segments being spaced apart and forming openings therebetween, said passageways terminating in said openings, said disk having a plurality of transverse slots in the peripheral edge, said slots intersecting said passageways whereby coolant fluid is conveyed to the radial faces of the disk and the zone of coaction between the abrasive material and a workpiece.

5. An abrasive grinding blade comprising a pair of circular plates, one radial face of each plate having a plurality of radial grooves therein, the grooves in said grooved radial faces being spaced circularly at corresponding angular positions in each of said plates, said plates having their grooved radial faces secured together with said grooves in alignment to form radial passageways, a plurality of abrasive segments secured to the peripheral edge of the disk, said segments being spaced apart and forming openings therebetween, said passageways terminating in said openings, said disk having a plurality of transverse slots in the peripheral edge, said slots being alternately shallow and deep and each of said slots intersecting one of said passageways whereby coolant fluid is conveyed to the radial faces of the disk and the zone of coaction between the abrasive material and a workpiece.

6. An abrasive grinding blade comprising a pair of circular metallic plates, one radial face of each plate having a plurality of radial grooves therein, the grooves in said radial faces being spaced circularly at corresponding angular positions in each of said plates, means for securing said grooved radial faces together in angular alignment with the grooves thereby forming radial passageways, a plurality of abrasive grinding segments, means for securing the segments to the peripheral edges of said plates, said segments being spaced apart in end to end relation on opposite sides of the passageways, whereby coolant fluid is conveyed through the passageways and between the segments to the grinding surface of the segments.

7. An abrasive grinding blade comprising a pair of circular plates, one radial face of each plate having a plurality of radial grooves therein, said plates having their grooved radial faces secured together, the grooves in one plate being spaced circularly from the grooves in the other plate, a plurality of abrasive segments secured to the peripheral edge of the disk, said segments being spaced apart and forming openings therebetween, said grooves terminating in said openings, whereby coolant fluid is conveyed to the zone of coaction between the abrasive material and a workpiece.

8. An abrasive grinding blade comprising a pair of circular plates, one radial face of each plate having a plurality of radial grooves therein, said plates having their grooved radial faces secured together, the grooves in one plate being spaced circularly from the grooves in the other plate, a plurality of abrasive segments secured to the peripheral edge of the disk, said segments being spaced apart and forming openings therebetween, said grooves terminating in said openings, and said disk having a transverse groove in the peripheral edge at each of said openings, whereby coolant fluid is conveyed to the zone of coaction between the abrasive material and a workpiece.

9. An abrasive grinding blade comprising a pair of circular plates arranged in abutting side-by-side relation and having coextensive peripheries, a plurality of abrasive segments secured to the peripheries of the plates in circumferentially spaced relation, and means forming one or more passageways between the inner faces of the plates and extending radially to the periphery of the blade between the abrasive segments.

10. An abrasive grinding blade comprising a pair of circular plates of equal diameter and arranged with inner faces in opposed abutting relation and having peripheries side-by-side and equally spaced from the center of the blade, a plurality of abrasive segments secured to the periphery of the blade in circumferentially spaced relation, each of said segments extending transversely in bridging relation over the edges of the plates and secured thereto, and means forming one or more passageways between the inner faces of the plates and extending radially to the periphery of the blade between the abrasive segments.

11. An abrasive grinding blade comprising a pair of circular plates of equal diameter and arranged with inner faces in opposed abutting relation and having peripheries side-by-side and equally spaced from the center of the blade, a plurality of abrasive segments secured to the periphery of the blade in circumferentially spaced relation, each of said segments extending transversely in bridging relation over the edges of the plates and secured thereto, and a plurality of registering radial grooves in the inner faces of the respective plates extending outwardly to the periphery of the blade between the abrasive segments.

12. An abrasive grinding blade comprising a pair of circular plates of equal diameter and arranged with inner faces in opposed abutting relation and having peripheries side-by-side and equally spaced from the center of the blade, a plurality of abrasive segments secured to the periphery of the blade in circumferentially spaced relation, each of said segments extending transversely in bridging relation over the edges of the plates and secured thereto, each of said plates having notches in the periphery thereof between the segments, and means forming passageways between the inner faces of the plates and extending radially to said notches for directing cooling water around said segments.

References Cited by the Examiner

UNITED STATES PATENTS 3,069,816  12/52  Pratt et al. _____ 51—206

FOREIGN PATENTS 576,794  4/46  Great Britain.
580,867  9/64  Great Britain.

LESTER M. SWINGLE, *Primary Examiner.*